July 6, 1937.   A. R. THOMPSON   2,086,103
CAN WEIGHING AND SEPARATING MACHINE
Filed Nov. 14, 1933    4 Sheets-Sheet 2

INVENTOR,
Albert R. Thompson
BY Booth & Booth
ATTORNEYS.

July 6, 1937.  A. R. THOMPSON  2,086,103
CAN WEIGHING AND SEPARATING MACHINE
Filed Nov. 14, 1933  4 Sheets-Sheet 3
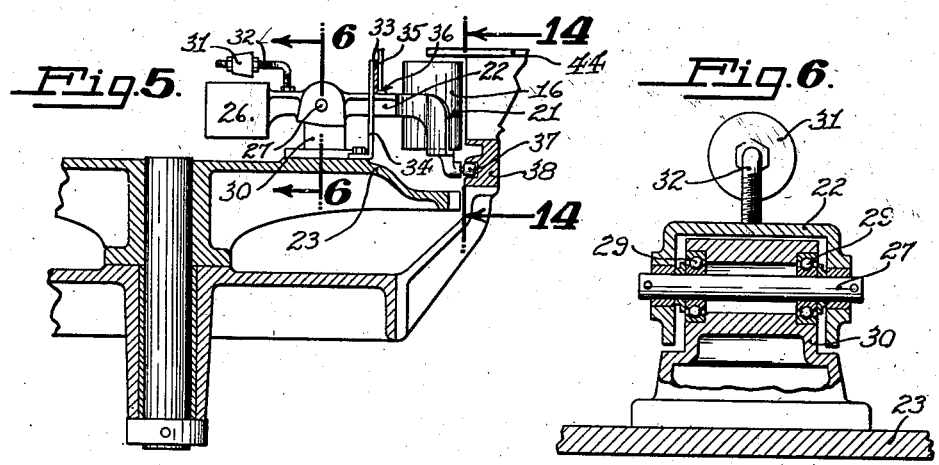
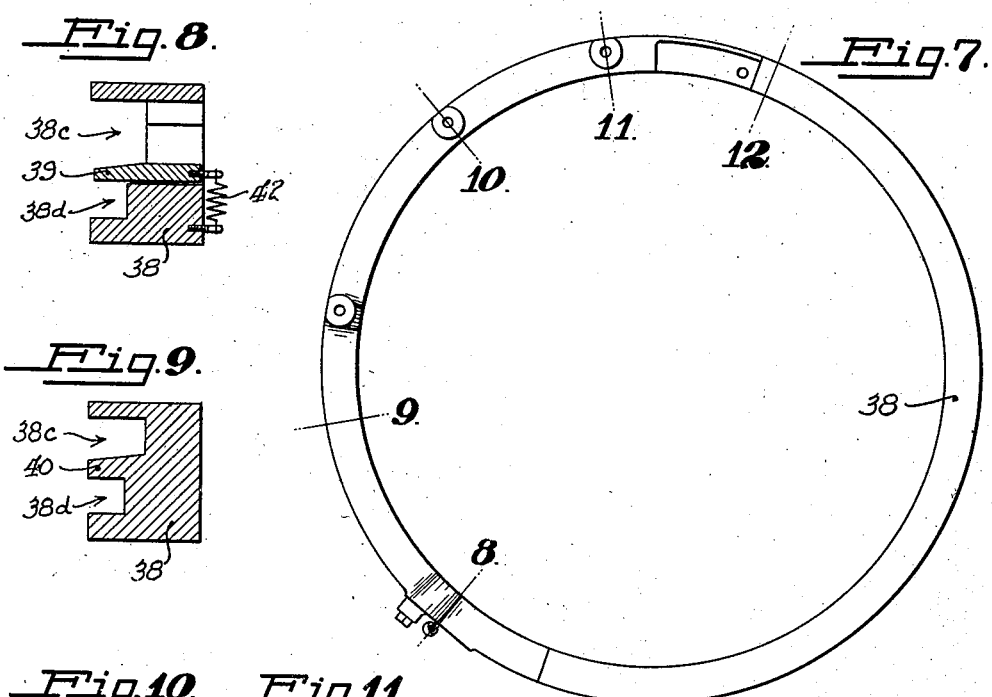
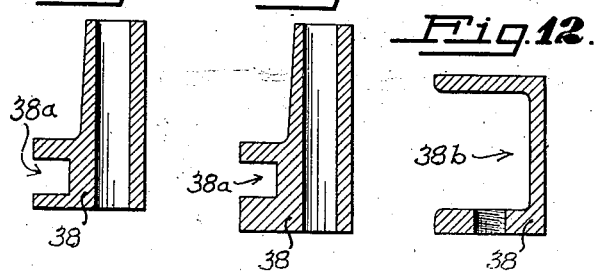
INVENTOR,
Albert R. Thompson
BY Booth & Booth
ATTORNEYS.

July 6, 1937.  A. R. THOMPSON  2,086,103
CAN WEIGHING AND SEPARATING MACHINE
Filed Nov. 14, 1933  4 Sheets-Sheet 4
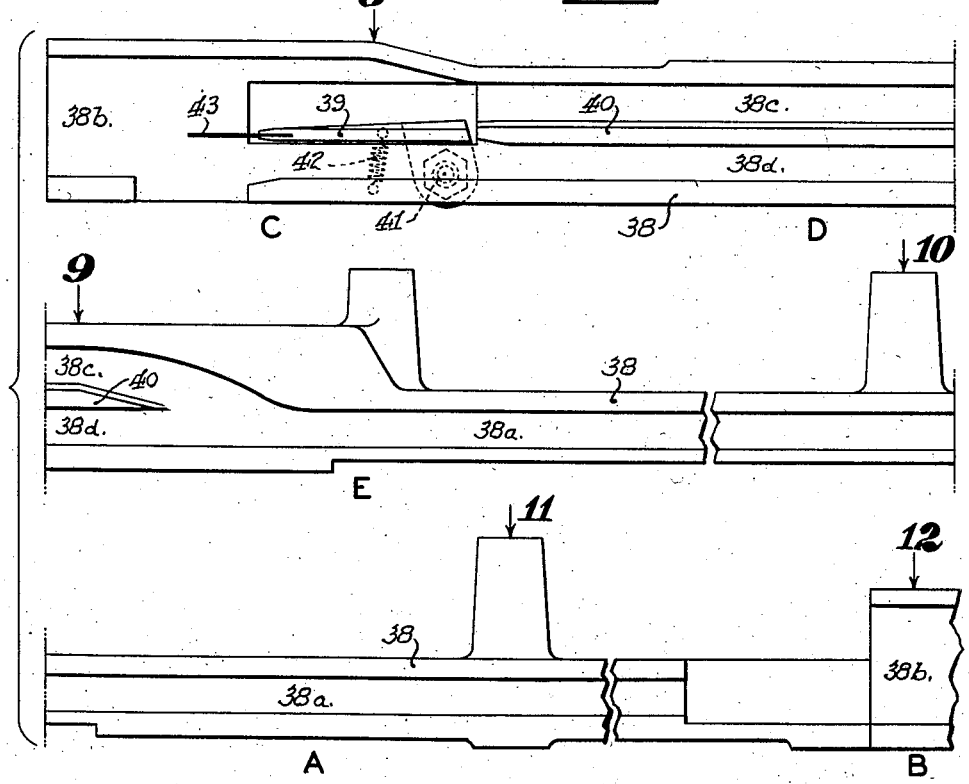
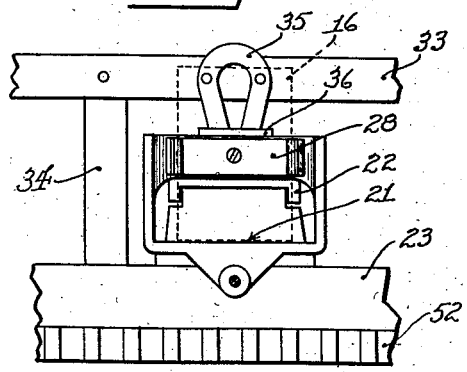
INVENTOR,
Albert R. Thompson
BY Booth & Booth
ATTORNEYS.

Patented July 6, 1937

2,086,103

UNITED STATES PATENT OFFICE 2,086,103

CAN WEIGHING AND SEPARATING MACHINE

Albert R. Thompson, San Jose, Calif., assignor to Food Machinery Corporation, San Jose, Calif., a corporation of Delaware Application November 14, 1933, Serial No. 697,898

12 Claims. (Cl. 209—121)

The present invention relates to a machine for successively weighing an advancing procession of objects, and automatically sorting and distributing them to a plurality of destinations, according to their individual weight, without interrupting their continuous advance.

In its most useful form, which is herein shown and described, the invention is embodied in a machine for weighing and sorting filled cans, such as those containing evaporated milk, for example, for the purpose of diverting the under-filled or light-weight cans from the advancing file of normally filled cans. The use of the machine in connection with the canning of liquids such as milk is particularly advantageous, because such products are customarily introduced into the cans through small holes in their tops, which prevents the operator of the filling machine from visually detecting an under-filled can; so that, if one or more cans should be under-filled, through faulty action of the filling machine, it is not discovered until some subsequent inspection, with the result that the entire run falls under suspicion and must be weighed as a check.

The principal object of the invention is to provide an automatic and continuously operating machine for receiving and advancing a succession of objects, such for example as filled cans, and for sorting and distributing them to different destinations according to their individual weight. The machine herein shown diverts those cans which are under weight and sends them to a destination separate from that of the normal weight cans.

Another object of the invention is to provide a machine which is sensitive but positive in action, and which is capable of operation at the same speed as other machinery used in the canning art. A still further object is to provide, in a weighing machine with a rotary turret upon which the balance members are mounted, means for adjusting said balance members to compensate for the centrifugal effect caused by the rotation of the turret.

Other objects and advantages of the invention will become apparent from the following description of a preferred embodiment, which should be read with the understanding that the form, arrangement and construction of the several parts may be varied, within the limits of the claims hereto appended, without departing from the spirit of the invention as defined therein.

The machine herein shown and described may be inserted in the canning line at any point subsequent to the filling machine. In milk canning, it is preferable to place the machine between the final processing apparatus, such as the cooker or cooler, and the labeling machine or station, so that it receives the filled and sealed cans as they come from the cooker or cooler, and passes them to the labeling station, diverting therefrom those cans which are under weight. These latter may then be disposed of in any desired manner.

Reference will be made to the accompanying drawings, in which:

Fig. 5 is a vertical section on the line 5—X of Fig. 1.

Fig. 6 is a vertical section, enlarged, on the line 6—6 of Fig. 5.

Fig. 7 is a plan view of the sorting cam track.

Figs. 8, 9, 10, 11, and 12 are transverse sections of the sorting cam track at the respectively numbered positions indicated on Figs. 7 and 13.

Fig. 13 is a projection of the sorting cam track in elevation as viewed from the inside, divided into three sections to permit a sufficiently large scale.

Fig. 14 is a vertical section, enlarged, on the line 14—14 of Fig. 5.

Figure 1:
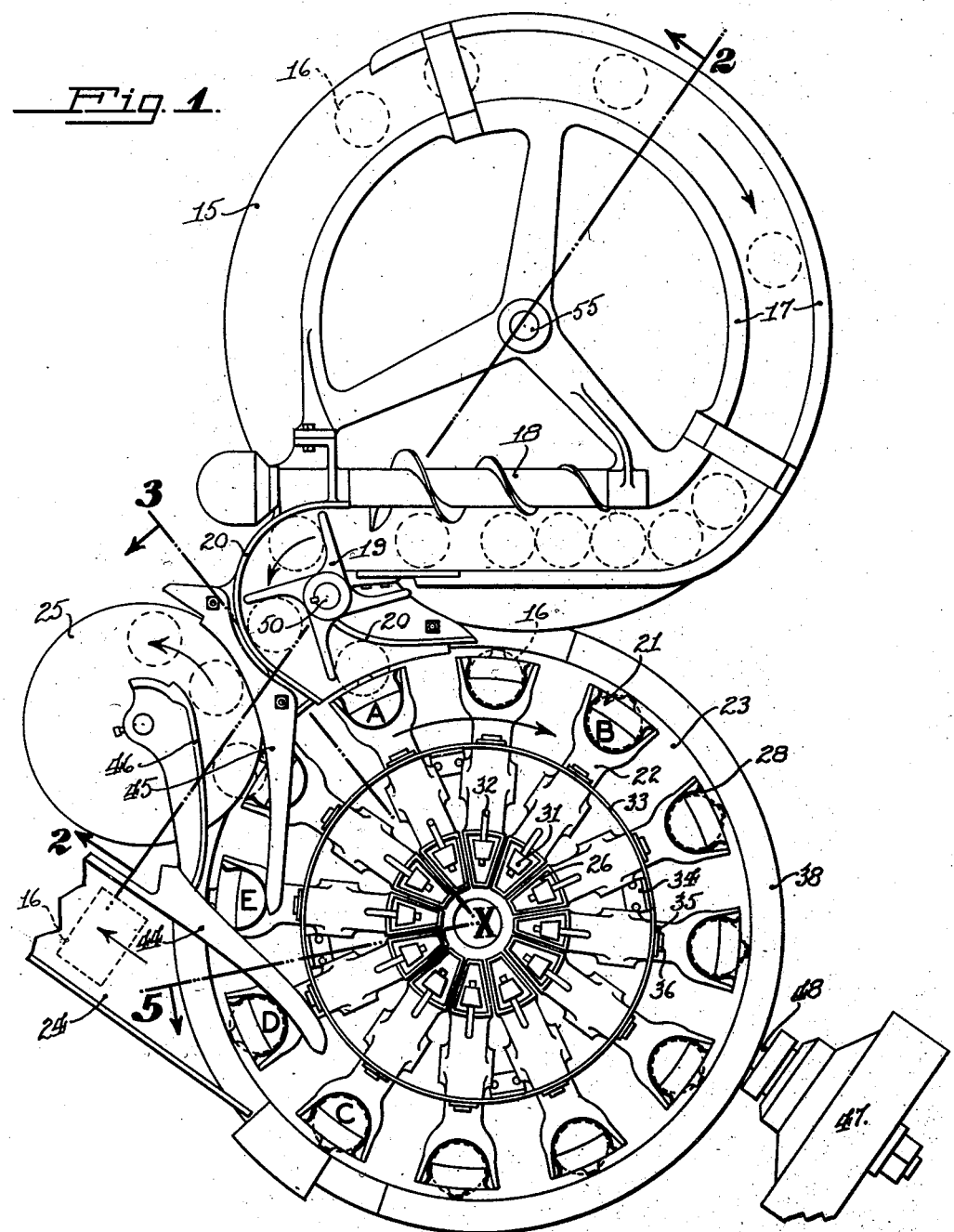
Fig. 1 is a plan view of the complete machine.
Figure 2:
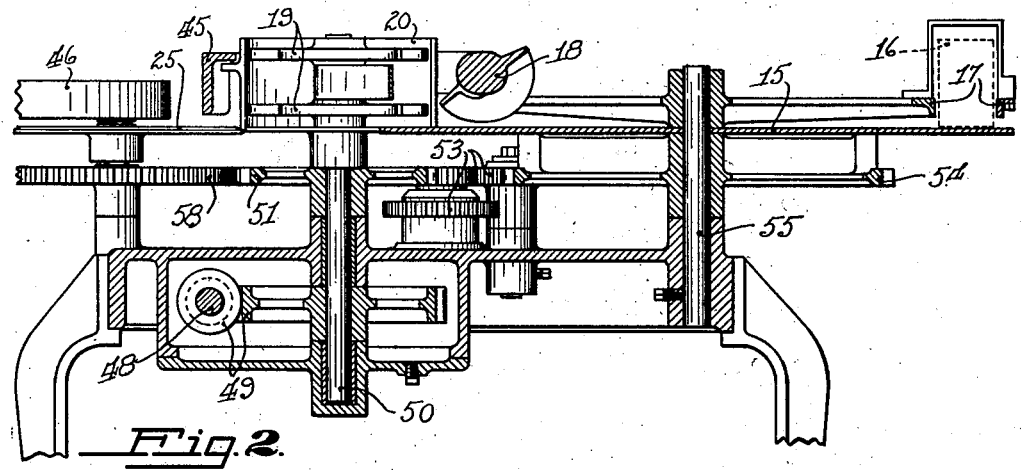
Fig. 2 is a vertical section on the line 2—2 of Fig. 1.

Referring more particularly to the drawings, the reference numeral 15, Figs. 1 and 2, designates a rotating feed table, upon which the cans 16 are deposited, on end, as they come from the previous treating apparatus, not shown. The rotation of the feed table 15 in the direction indicated, carries the cans in single file between stationary circular guide rails 17 to a timing screw 18. The latter feeds the cans, in timed procession, to a star wheel 19, which advances them between stationary guides 20 and places them in the pockets 21 of the balance members 22.

The balance members 22 are mounted radially upon a continuously rotating turret 23, Fig. 1, by which the cans are carried around, in the direction of the curved arrow, and discharged either into a chute 24 or upon a disk 25, the under weight cans being diverted into said chute 24, and the full weight cans going on to the disk 25, from which they may be transferred, by any means not shown, to a subsequent handling apparatus.

Each balance member 22 is formed as an arm with the can receiving pocket 21 at its outer end and a counter weight 26 at its inner end, and is pivotally mounted at 27 (Fig. 5) for limited swinging movement in a vertical plane. The pocket 21 has a semicircular spring 28, Fig. 1, fastened at its center to the rear wall of the pocket, and having resilient fingers adapted to embrace the can to hold it in a definite fixed position within said pocket. The pivot of the balance arm is preferably provided with ball bearings 29 mounted in a pedestal 30 rising from the turret, as shown in Fig. 6.

The inner end of the balance arm 22 is provided with an adjustable counterweight 31 in addition to the fixed counterweight 26. The weight 31 is threaded upon the horizontal end of a bent stem 32, Fig. 5, whose vertical end is threaded into the member 22. Thus the weight 31 can be adjusted both vertically and horizontally, the vertical adjustment providing compensation for the effect of centrifugal force due to rotation of the turret.

The outer ends of the balance arms 22 are prevented from rising too high by a ring 33, Figs. 1, 5, and 14, secured to the turret 23 by upstanding brackets 34. Attached to said ring above each balance arm is a small permanent magnet 35, which attracts a magnetic armature 36 secured to the top of the balance member, the member itself being made of non-magnetic material, preferably aluminum. Thus the balance arms are held at the upper limit of their movement with a small and easily overcome force, for a purpose to be explained hereinafter.

Figure 3:
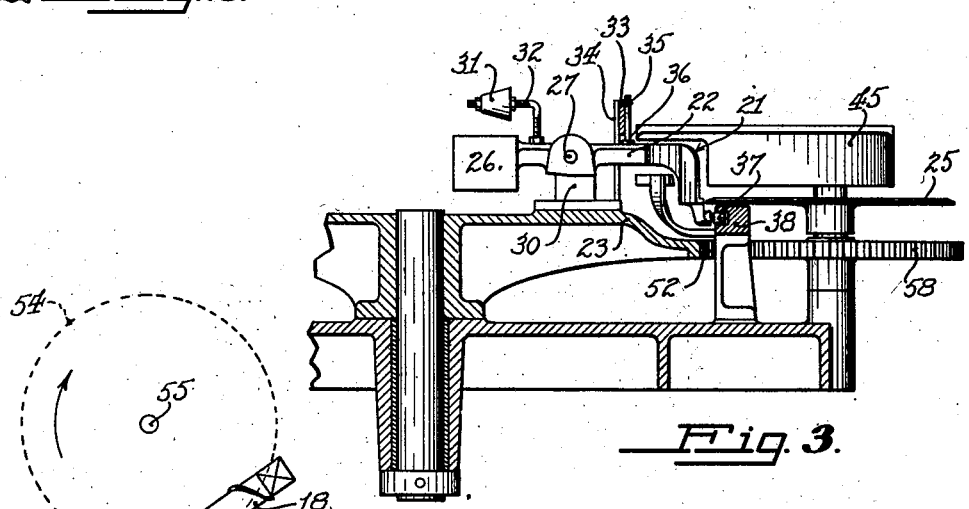
Fig. 3 is a vertical section on the line 3—X of Fig. 1.

A roller 37, Figs. 3 and 5, is mounted upon the outer end of each balance arm 22, and runs in the channel of a stationary circular cam track 38 secured to the frame of the machine. At the position A of Fig. 1, where the can is placed in the pocket of the balance arm, the channel 38a of the track 38 is narrow, as shown in Figs. 10, 11, and 13, and is so positioned as to hold the outer end of the arm in its lowest position, so that the bottom of the pocket 21 is on the same level as the feed table 15. This position of the balance arm 22 is the same as that shown in Fig. 3, the feed table 15 and the discharge disk 25 being at the same level. At or slightly before the position B is reached, i. e. after the can has been placed in the pocket 21, the cam track widens out, as shown at 38b in Figs. 12 and 13, to permit the arm 23 to move freely up or down according to the weight of the can in its pocket 21. If the can is of normal weight, the arm 23 remains down, but if said can is under weight, the arm moves up and is held at its upper limit by the magnet 35. The force of said magnet is not sufficient to raise the arm with a full weight can, but will hold it up, to prevent fluttering, when it is raised by the overbalancing of a lightweight can.

The wide portion 38b of the track 38 continues for about half the revolution of the turret, to give sufficient time for the arm to settle in a position of balance according to the weight of the can in its pocket. At the position C of Fig. 1, the wide channel is divided into upper and lower narrow channels 38c and 38d, Figs. 8, 9 and 13, so that the arm is thereafter held positively in whichever position, upper or lower, the weight of the can has caused it to assume.

In order to insure that the roller 37 will enter one or the other of the channels 38c or 38d, the end portion 39 of the central rail 40 between said channels is hinged, as shown in Figs. 8 and 13, about a pivot 41, and is held in horizontal position by a spring 42. The extreme end of said hinged portion, moreover, is formed as a flexible leaf 43 of thin spring metal. If, due to a slight fluttering of the balance arm, the roller 37 should approach the double track section in a slightly elevated position, and should strike the end of the spring leaf 43, the hinged extension 39 would swing upwardly, thereby causing the roller to pass into the lower channel 38d. If the can is sufficiently under weight to allow the balance arm to rise to the upper limit of its movement, at any point between the positions B and C, the magnet 35 will hold it there, as described above, and the roller 37 will pass above the extension 39 into the upper channel 38c, but there being no corresponding means to positively hold the arm down when carrying a normal weight can, it may flutter slightly in the lower range of its movement, and cause the roller 37 to strike the end of the extension 39. It is to prevent damage under such conditions that said extension is made yieldable, as described, to guide the roller into the lower channel.

Assuming the can to be under weight, and the balance arm 22 to be at the upper limit of its movement, and positively held by having its roller 37 enter the upper channel 38c, the upper portion of the can is engaged by a stationary stripper 44, Figs. 1 and 5, at the position D, and the can is thereby forced out of the arm pocket and tipped over on to its side into the chute 24, down which it rolls to a suitable destination.

On the other hand, if the can is of normal weight, and the arm 22 is held down by its roller entering the lower channel 38d, the can passes freely beneath the stripper 44 and continues to the position E, where it encounters a lower stationary stripper 45, Figs. 1, 2, and 3, which slides it out of the pocket, without tipping it over, and transfers it, on end, to the rotating discharge disk 25, from which it is removed by any suitable means not shown. A guide 46, spaced from the stripper 45 holds the can on end and assists in transferring it to the disk 25.

The upper channel 38c merges with the lower channel 38d at or near the position E, as shown in Fig. 13, and thereafter continues straight as the channel 38a, so that the balance arm which has been elevated, and from which the lightweight can has been removed at the position D, descends again to its lower position in time to receive a new can at the position A. The arms which have held normal weight cans have remained in their lower positions throughout.

Figure 4:
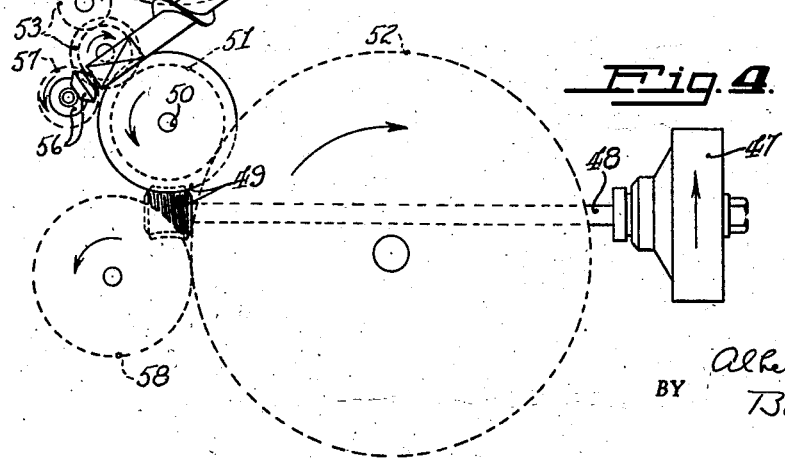
Fig. 4 is a diagrammatic plan of the drive mechanism.

Any suitable means may be provided for driving the various parts in timed relation. A preferred driving arrangement is shown in part in Figs. 1 and 2 and in diagrammatic plan in Fig. 4. A suitable clutch pulley 47 is mounted upon a horizontal shaft 48 beneath the turret 23. The other end of said shaft drives, through worm gearing 49, a vertical shaft 50 upon which the star wheel 19 is mounted. A spur gear 51, secured upon said vertical shaft, meshes with a gear 52 formed upon the outer periphery of the turret 23, and also drives the feed table 15 through a train of idlers 53 and a large gear 54 secured upon the shaft 55 of said feed table. The timing screw 18 is driven by bevel gears 56 and a spur gear 57 meshing with one of the idlers 53. The discharge disk 25 is driven by a gear 58 meshing with the turret gear 52.

It will be seen from the foregoing that the machine receives a continuously advancing procession of cans and places them successively upon the balance arms 22; they are then allowed to seek one of two positions, vertically, according to their weight, and are positively held in such position by the roller 37 entering one of the two channels, 38c or 38d, of the sorting cam track; and finally, the cans are distributed to different destinations according to the vertical positions that they occupy.

I claim:

1. An apparatus for the described purpose comprising a vertically movable and horizontally advancing balance member for receiving and holding an object; a cam track in which a follower portion of said member travels during its advance, said track having a wide portion permitting free vertical movement of said member during one phase of its advance during which it may assume a relative vertical position according to the weight of the object, and said track having parallel narrow portions separated by a dividing rail to hold said member in its assumed vertical position during a succeeding phase of its advance; and a swinging member forming an extension of said rail at its forward end to guide the follower portion of said member smoothly into one of said narrow track portions, said swinging member being mounted for transverse movement across said narrow track portions to close either one thereof and open the other.

2. An apparatus for the described purpose comprising a vertically movable and horizontally advancing balance member for receiving and holding an object; a cam track in which a follower portion of said member travels during its advance, said track having a wide portion permitting free vertical movement of said member during one phase of its advance during which it may assume a relative vertical position according to the weight of the object, and said track having parallel narrow portions separated by a dividing rail to hold said member in its assumed vertical position during a succeeding phase of its advance; and a swinging extension of said rail at the transition point between said wide and narrow track portions for guiding the follower of said member smoothly into one of said narrow portions; said extension having a resilient tongue at its forward end.

3. An apparatus for the described purpose comprising a rotating turret; a plurality of radially disposed balance members carried thereby for receiving and holding objects, said members assuming different positions according to the weight of the objects thereon; a ring mounted above said turret in fixed relation thereto; a plurality of magnets carried by said ring, said magnets being positioned to engage said members to limit their balancing movement and to yieldably hold them in one assumed position; and means for removing the objects from said members to different destinations according to their assumed positions.

4. In an apparatus for the described purpose, a rotating turret; a pivotally mounted balance member thereon having means for removably holding an object; and balancing means carried by said member, said balancing means being vertically adjustable to bring said member with said object thereon into dynamically balanced relation and to maintain said relation irrespective of the speed of rotation of said turret.

5. In an apparatus for the described purpose, a rotating turret; a balance beam thereon having means for holding a load; a fulcrum for said beam intermediate its ends; and means for counterbalancing the load comprising a vertically adjustable weight carried by said beam, said weight being adjustable to compensate for changes in the vertical dimension of the load, whereby to dynamically balance the loaded beam.

6. In an apparatus for the described purpose, a rotating turret having a substantially vertical axis; a fulcrumed balance member mounted on said turret for rocking movement in a vertical plane substantially radial to said axis; means for removably holding a load on said member; and balancing means mounted on said member for adjustment both horizontally and vertically, whereby to dynamically balance the loaded member and to compensate for the unbalancing effect of the centrifugal forces set up by the rotation of said turret.

7. In an apparatus for the described purpose, a rotating turret; a plurality of movable balance members carried thereby for receiving and holding objects, said members assuming different positions during the rotation of said turret according to the weights of the objects upon them; means for removing said objects from said balance members in one assumed position thereof; means for initially releasably holding said members in said assumed position to prevent fluttering thereof; means engaging the releasably held members to positively hold them in said assumed position while their objects are being removed; and means for subsequently releasing said members both from said positive holding means and from said initial releasable holding means, whereby to restore them to a condition of free movement to weigh succeeding objects.

8. In an apparatus for the described purpose, a rotating turret; a plurality of movable balance members carried thereby for receiving and holding objects, said members assuming different positions during the rotation of said turret according to the weights of the objects upon them; means for removing said objects from said balance members in one assumed position thereof; magnets positioned to attract and releasably hold said members in said assumed position to prevent fluttering thereof; means engaging said members while attracted by said magnets to positively hold them in said assumed position while their objects are being removed; and means for subsequently releasing said members from said positive holding means and from said magnets, whereby to restore them to a condition of free movement to weigh succeeding objects.

9. An apparatus for the described purpose comprising a turret rotatable about a substantially vertical axis, a balance member mounted thereon for movement about a substantially horizontal fulcrum positioned between its ends, means for removably holding a load at one end portion of said member, and counterbalancing means carried upon the other end portion of said member, said counterbalancing means being vertically adjustable to vary the distribution of the aggregate mass of the loaded member about said fulcrum so as to bring the moments at said fulcrum of the horizontal centrifugal forces acting upon the respective end portions of said loaded member into balance irrespective of their magnitude, whereby the balance of said loaded member will be unaffected by the speed of rotation of the turret.

10. An apparatus for the described purpose comprising a turret rotatable about a substantially vertical axis, a balance member mounted thereon for movement about a substantially horizontal fulcrum positioned between its ends, means for removably holding a load at one end portion of said member, and an adjusting weight mounted upon said member, said weight being adjustable in two different planes to distribute the aggregate mass of the loaded member about said fulcrum in such a manner as to cause the moments at said fulcrum of the horizontal centrifugal forces acting upon the respective end portions of said loaded member to be balanced irrespective of their magnitude, whereby the balance of said loaded member will be unaffected by the speed of rotation of the turret.

11. An apparatus for the described purpose comprising a vertically movable and horizontally advancing balance member for receiving and holding an object; a cam track in which a follower portion of said member travels during its advance, said track having a wide portion permitting free vertical movement of said member in one phase of its advance during which it may assume a relative vertical position according to the weight of the object, and said track having parallel narrow portions separated by a dividing rail to hold said member in its assumed vertical position during a succeeding phase of its advance; and a pivotally mounted swinging member forming an extension of said rail aligned therewith at its forward end, the pivot of said member being vertically displaced from the horizontal center line of said extension, whereby the impact of said follower portion against the end of said extension will cause it to swing vertically to guide said follower portion into one of said narrow track portions.

12. In an apparatus for the described purpose, a travelling member mounted for movement transversely to its direction of travel; a guide rail parallel to said direction of travel, said member passing to one side or the other of said guide rail and being limited thereby in its transverse movement; and a pivotally mounted extension aligned with the forward end of said guide rail, the pivot thereof being transversely displaced from the center line of said extension, whereby the impact of said traveling member against the end of said extension will cause it to swing transversely to guide said member to one side of said rail.

ALBERT R. THOMPSON.